Figures 1, 2:
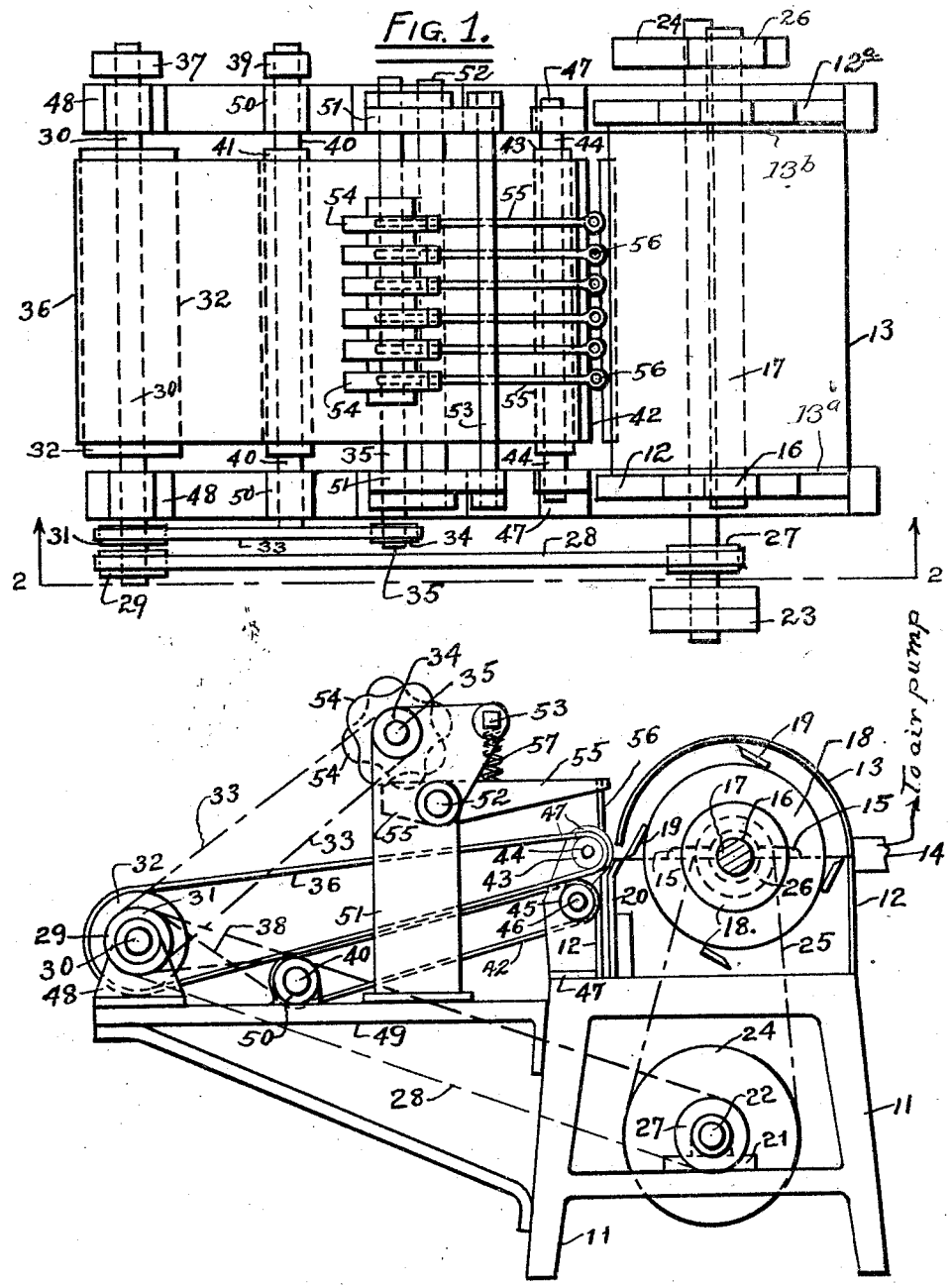

Sept. 7, 1926.  1,598,761
O. DINGFELD ET AL
PELT FEEDING MECHANISM FOR SHEARING MACHINES
Filed July 3, 1925

Inventors:
Oscar Dingfeld
Ferdinand M. Wegner
By their Attorney
Israel Benjamins.

Patented Sept. 7, 1926.

1,598,761

UNITED STATES PATENT OFFICE.

OSCAR DINGFELD AND FERDINAND M. WEGNER, OF BROOKLYN, NEW YORK.

PELT-FEEDING MECHANISM FOR SHEARING MACHINES.

Application filed July 3, 1925. Serial No. 41,385.

Our invention relates to improvements in a pelt feeding mechanism for fur-shearing machines, and it consists in the novel features hereinafter more fully described.

One of the objects of our improvement is: to do away with the necessity of sewing together the pelts preliminary to feeding them to the fur shearing machine.

Another object of our improvement is: to provide an improved mechanism for feeding pelts singly, one after another, to a fur shearing machine; also to keep the pelts down when they are being sheared, and to prevent the ends of the pelts from being drawn in by suction into the fur shearing mechanism and from being injured by the knives thereof.

Another object of our improvement is: to have the entire fur on the pelts evenly sheared without leaving any streaks of unsheared fur or of longer fur than on the rest of the pelt.

A further object of our improvement is: to have said mechanism simple, durable and inexpensive.

Other objects and advantages will hereinafter appear.

We attain these objects by the mechanism illustrated in the accompanying drawings, which are a more or less diagrammatical illustration of our machine or by any mechanical equivalent or obvious modification of the same.

In the drawings Fig. 1 is a plan or top view of our pelt feeding mechanism for fur shearing machines, and Fig. 2 is a vertical elevation of the same, partly in section on the line 2—2 of Fig. 1, leaving out the front pedestal and front plate of the shearing machine, which is hereinafter described.

Similar numerals refer to similar parts throughout the several views.

11 designates the base of a fur shearing machine, on which are mounted a pair of pedestals 12 and the cover 13 with the front and rear plates 13ᵃ and 13ᵇ, enclosing a vacuum chamber therebetween, which has therein an opening for the fur of the pelts to be sheared, and it communicates by means of an outlet 14 with an air pump, which may be operated to maintain a suitable degree of vacuum in said chamber.

The pedestals 12 are provided with caps 15 and journals 16 for a shaft 17, which has mounted thereon a rotor 18, carrying revolving knives 19 to act in conjunction with a stationary knife 20, to shear the fur of pelts fed thereto.

The base 11 also has mounted on the lower part thereof a pair of bearings 21 for a spindle 22, which carries at the front end thereof a pair of power pulleys 23, which are shown in Fig. 1, and at the rear end thereof a driving pulley 24, which is operatively connected by means of a belt 25 with a driven pulley 26, which is carried by the rear end of said shaft 17.

The spindle 22 also has mounted thereon a driving pulley 27, which is connected by means of a belt 28 with a driven pulley 29 of our pelt feeding mechanism; said pulley 29 is carried by the front end of a spindle 30, which also carries a driving pulley 31 and has mounted thereon the outer roll 32 of an upper conveyor 36.

The pulley 31 is operatively connected by means of a belt 33 with a driven pulley 34, which is carried by the front end of a cam spindle 35.

The spindle 30 carries at the rear end thereof a driving pulley 37, which is operatively connected by means of a crossed belt 38, which is shown in Fig. 2 and omitted in Fig. 1, to a driven pulley 39 at the rear end of a spindle 40, which has mounted thereon the outer roll 41 of our lower conveyor 42, which is hereinafter more fully described.

The upper conveyor 36 is also provided with an inner roll 43, which is mounted on a spindle 44, and the lower conveyor 42 is provided with an inner roll 45, which is mounted on a spindle 46, which is shown in Fig. 2.

The spindles 44 and 46 are supported by a pair of brackets 47, which are mounted on the base 11.

The spindle 30 is supported by a pair of bearings 48, which are mounted on an extension 49 of said base 11; and the spindle 40 is supported by a pair of bearings 50, which are made in one piece with said extension 49.

The cam spindle 35 is supported by a pair of brackets 51, which also support a spindle 42, which has swivelled thereon a plurality of oscillating arms 55, and a spring bar 53, which is hereinafter described.

The spindle 35 has mounted thereon a plurality of four lobed cams 54 in variable positions, as shown in Fig. 2, where two positions of said cams are shown; but the number of variable positions of the cams 54 may be larger than two, if desired.

Each of said cams 54 actuates the outer end of an oscillating arm 55, which has connected thereto at the inner end thereof a semi-flexible feed finger 56, which, when released by said cam 54, has its end normally in contact with the upper conveyor 36 or with any pelt, which may be carried thereon, by means of its own elasticity aided by springs 57, which are abutting at their upper ends against said bar 53 and at their lower ends against the inner ends of said oscillating arms 55.

The operation of our pelt feeding mechanism for fur shearing machines is as follows:

The fur shearing machine being set into motion by means of the power pulleys 23, all of the spindles hereinbefore described are turned each at a required speed.

Pelts are then fed one after another on to the upper conveyor 36; the inner or front end of each pelt is kept by the fingers 56 from being drawn into the vacuum chamber which is hereinbefore described while the fur on said pelt is being sucked into position to be clipped by said knives 19 and 20.

The fingers 56 are vibrated in multiple sets alternately upwardly and downwardly by the action of said cams 54 on the arms 55, to allow all of the fur under the tips of any set of said fingers to be drawn into shearing position when said fingers are lifted, while the pelt is being kept down to the conveyor 36 on the roll 43 by the tips of alternate sets of fingers, which are bearing on said pelts, while the other set of fingers is being raised and before the latter is lowered into contact with said pelts.

After passing the tips of said fingers 56 the inner or front edges of said pelts are drawn into the narrow space between the upper conveyor 36 and the lower conveyor 42, and the pelts are carried by the joint action of said conveyor outwardly, to be deposited into a suitable receptacle, which is not shown in the drawings.

By these means we do away with the necessity of sewing the ends of the pelts to each other for feeding the pelts in a continuous strip, whereby the speed of operation is increased and labor is saved.

By alternating the phases of motion of said sets of fingers 56, the entire fur on the pelts is evenly sheared without leaving any streaks of fur unsheared or longer than the rest of the fur on the pelt, as may be the case with some machines of standard practice, in which cords are being used for keeping down the pelts. Many changes may be made in the details of our mechanism without departing from the main scope of our invention, and parts of our mechanism may be used without other parts.

We do not, therefore, restrict ourselves to the details as shown in the drawings; but we intend to include also all mechanical equivalents and obvious modifications of the same within the scope of our invention.

We claim as our invention, and desire to secure by Letters Patent:

1. In a pelt feeding mechanism for a fur shearing machine an upper conveyor for feeding thereon pelts to said machine, a means for holding the ends of the pelts in contact with said conveyor when the fur thereof is being sheared and a lower conveyor to cooperate with said upper conveyor in removing said pelts from said machine after the shearing operation.

2. In a pelt feeding mechanism for a fur shearing machine a conveyor for feeding thereon pelts to said machine, fingers for holding the ends of the pelts in contact with said conveyor when the fur thereof is being sheared, oscillating arms to carry said fingers and multiple-positioned cams for actuating said arms.

3. In a pelt feeding mechanism for a fur shearing machine a conveyor for feeding thereon pelts to said machine, oscillating fingers for holding the ends of said pelts in contact with said conveyor when the fur thereof is being sheared, a means for keeping said fingers in variable positions when in operation and a means for actuating said fingers.

4. In a pelt feeding mechanism for a fur shearing machine a conveyor for feeding thereon pelts to said machine, fingers for holding the ends of the pelts in contact with said conveyor when the fur thereof is being sheared, oscillating arms to carry said fingers and cams for actuating said arms.

5. In a pelt feeding mechanism for a fur shearing machine a conveyor for feeding thereon pelts to said machine, fingers for holding the ends of the pelts in contact with said conveyor when the fur thereof is being sheared, oscillating arms to carry said fingers and a means for actuating said arms.

6. In a pelt feeding mechanism for a fur shearing machine a conveyor for feeding thereon pelts to said machine, semiflexible oscillating fingers for holding the ends of the pelts in contact with said conveyor when the fur thereof is being sheared and a means for actuating said fingers.

7. In a pelt feeding mechanism for a fur shearing machine a conveyor for feeding thereon pelts to said machine, oscillating fingers for holding the ends of the pelts in contact with said conveyor when the fur thereof is being sheared and a means for actuating said fingers.

8. In a pelt feeding mechanism for a fur shearing machine a means for feeding thereon pelts to said machine, oscillating fingers for holding the ends of the pelts in contact with said feeding means when the fur thereof is being sheared and a means for actuating said fingers.

OSCAR DINGFELD.
FERDINAND M. WEGNER.